(12) United States Patent
He et al.

(10) Patent No.: US 8,100,116 B2
(45) Date of Patent: Jan. 24, 2012

(54) DIESEL EMISSION REDUCTION USING INTERNAL EXHAUST GAS RECIRCULATION

(75) Inventors: Xin He, Denver, CO (US); Russell P. Durrett, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 335 days.

(21) Appl. No.: 12/499,475

(22) Filed: Jul. 8, 2009

(65) Prior Publication Data

US 2010/0018483 A1  Jan. 28, 2010

Related U.S. Application Data

(60) Provisional application No. 61/082,638, filed on Jul. 22, 2008.

(51) Int. Cl.
*F02B 47/08* (2006.01)
*F02B 47/10* (2006.01)

(52) U.S. Cl. .................................. 123/568.14
(58) Field of Classification Search .......... 123/568.14, 123/568.11, 545, 546, 547, 90.15; 701/108; 60/605.1, 605.2
See application file for complete search history.

(56) References Cited

U.S. PATENT DOCUMENTS

5,603,292 A * 2/1997 Håkansson ............... 123/90.16
2003/0196646 A1* 10/2003 Shoyama et al. ........ 123/568.14
* cited by examiner

*Primary Examiner* — Mahmoud Gimie (57) ABSTRACT

A method for controlling combustion in a direct-injection diesel engine includes monitoring a crankshaft rotational position of a cylinder of the engine, monitoring an engine load, determining an intake stroke within the cylinder based upon the crankshaft rotational position, and when the engine load is less than a threshold engine load, opening an exhaust valve for the cylinder during a portion of the intake stroke.

16 Claims, 5 Drawing Sheets

DIESEL EMISSION REDUCTION USING INTERNAL EXHAUST GAS RECIRCULATION

CROSS REFERENCE TO RELATED APPLICATIONS

This application claims the benefit of U.S. Provisional Application No. 61/082,638 filed on Jul. 22, 2008 which is hereby incorporated herein by reference.

GOVERNMENT LICENSE RIGHTS

The U.S. Government has a paid-up license in this disclosure and the right in limited circumstances to require the patent owner to license others on reasonable terms as provided for by the terms of Cooperative Agreement Number DE-FC26-05NT42415 awarded by the U.S. Department of Energy.

TECHNICAL FIELD

This disclosure relates to direct injection diesel engines.

BACKGROUND

The statements in this section merely provide background information related to the present disclosure and may not constitute prior art.

Regulatory restrictions on diesel engines include restrictions on emissions. Advanced combustion strategies are developed in order to manage these emissions. Various aftertreatment systems, such as diesel particulate filters, urea-selective catalytic reduction devices, NOx aftertreatment systems, diesel oxidation catalysts, and lean NOx traps, may be used to reduce emissions to meet the emission regulations.

Figure 1:
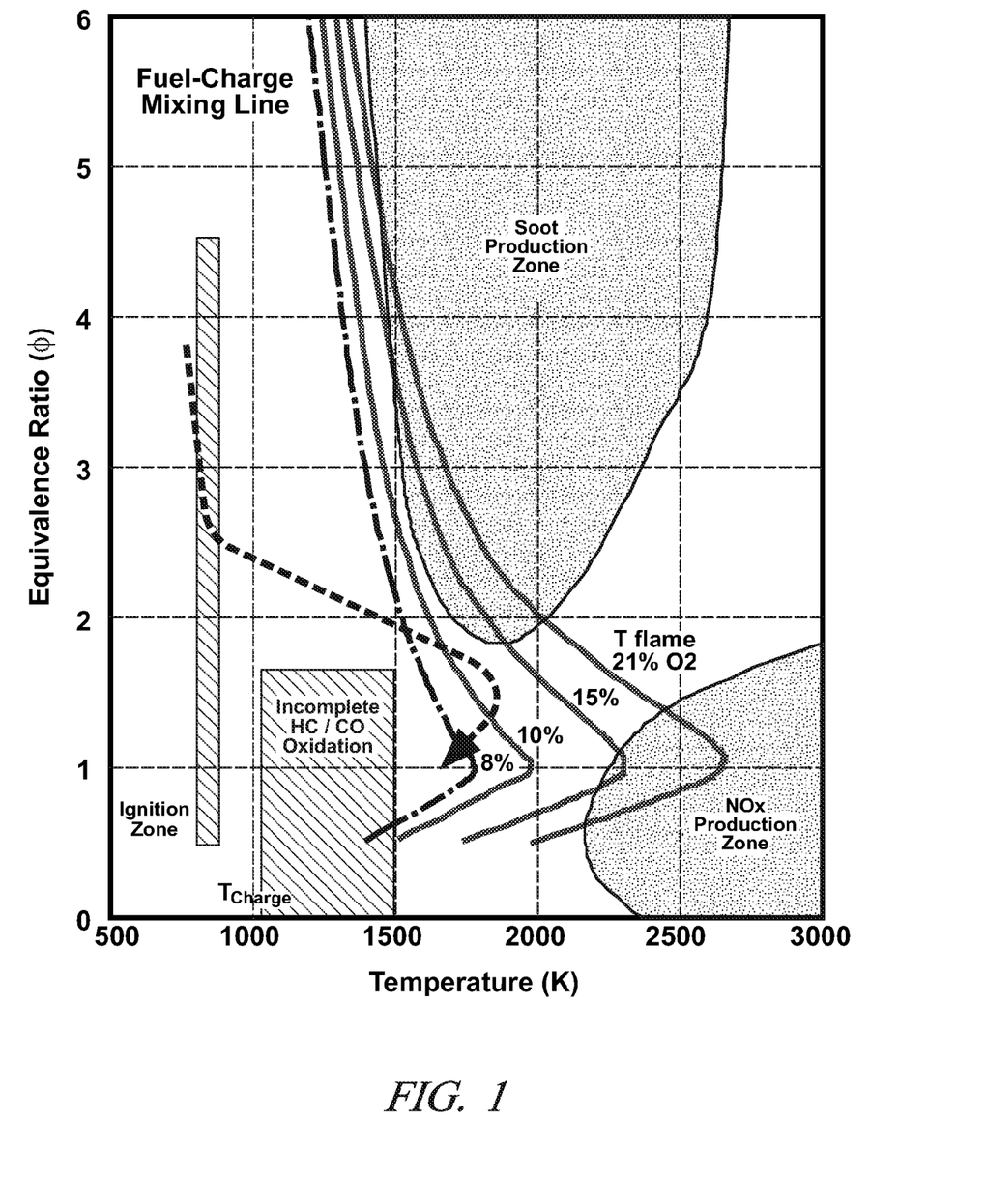
FIG. 1 graphically illustrates emissions concerns related to diesel combustion and the effects of temperature and low load operation, in accordance with the present disclosure.

Low temperature combustion (LTC) is one technology to reduce the engine-out NOx emissions. FIG. 1 graphically illustrates emissions related to diesel combustion and the effects of temperature and low load operation, in accordance with the present disclosure. As illustrated, NOx emissions increase with an increase in combustion temperatures. Using exhaust gas recirculation (EGR), a method known in the art wherein exhaust gas is recirculated through the combustion chamber to introduce an inert gas into combustion process and thereby lower combustion temperatures, NOx emissions are significantly reduced. However, the HC and CO emissions may increase due to the lower combustion temperature. In particular, HC and CO emissions can become undesirably excessive at idle or low load operation during cold start conditions. As is well known in the art, aftertreatment devices require a particular temperature range in which to operate in order to be effective. Since the exhaust gas temperature is very low at these conditions, the after-treatment systems cannot reach temperatures effective to oxidize HC and CO.

SUMMARY

A direct-injection diesel engine includes an intake valve, an exhaust valve, and a plurality of valve activation devices. A variable volume combustion chamber is defined by a piston reciprocating within a cylinder between top-dead center and bottom-dead center points, intake and exhaust passages, and intake and exhaust valves controlled during repetitive, sequential exhaust, intake, compression and expansion strokes of the piston. A method for controlling the engine includes monitoring crankshaft rotational position, monitoring engine load, determining an intake stroke within a cylinder based upon the crankshaft rotational position, and when the engine load is less than a threshold engine load, opening an exhaust valve during a portion of the intake stroke.

BRIEF DESCRIPTION OF THE DRAWINGS

One or more embodiments will now be described, by way of example, with reference to the accompanying drawings, in which.

DETAILED DESCRIPTION

Figure 2:
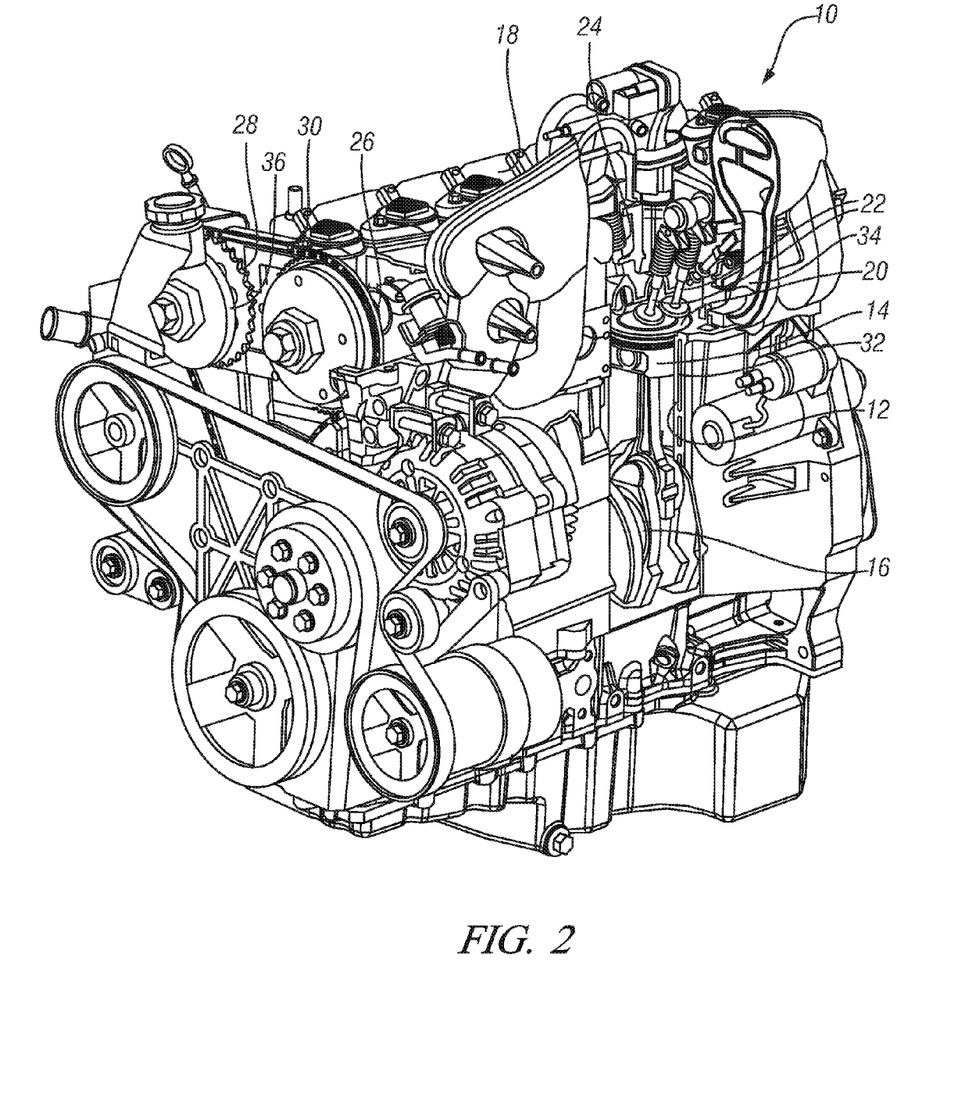
FIG. 2 is a partial sectional representation of an exemplary diesel engine, in accordance with the present disclosure.

Referring now to the drawings, wherein the showings are for the purpose of illustrating certain exemplary embodiments only and not for the purpose of limiting the same, FIG. 2 is a partial sectional representation of an exemplary diesel engine, in accordance with the present disclosure. Engine 10 includes a plurality of cylinders 12 having therein reciprocable pistons 14 connected with a crankshaft 16. This disclosure is generally applicable to direct-injection, four-stroke compression ignition engines. The ends of the cylinder are closed by a cylinder head 18 so that the cylinders and pistons define variable volume combustion chambers 20.

The cylinder head is provided with intake valves 22 which control the timing and flow of intake air into the cylinders during intake strokes of the pistons. Exhaust valves 24 in the cylinder head control timing and flow of exhaust products from the combustion chambers during exhaust strokes of the pistons. In the engine shown there are two intake valves and two exhaust valves for each cylinder, however, any suitable number of valves provided for operation of the engine may be utilized in accordance with the disclosure.

The intake and the exhaust valves are actuated by separate valve actuation devices 26, 28. The valve actuation devices exclusively operate their respective intake and exhaust valves, however, both are driven by the crankshaft 16 through a timing chain 30.

The exemplary engine 10 includes a cast-metal engine block with a plurality of cylinders formed therein and an engine head. The engine block preferably includes coolant passages 32 through which engine coolant fluid passes. A coolant temperature sensor, operable to monitor temperature of the coolant fluid, is located at an appropriate location, and provides a parametric signal input to a control system indicative of engine operating temperature useful in engine control. The engine preferably includes known systems including an external exhaust gas recirculation (EGR) valve and an intake air throttle valve.

Each piston 14 is connected via a pin and connecting rod to the crankshaft 16. The crankshaft 16 is rotatably attached to the engine block at a main bearing area near a bottom portion of the engine block, such that the crankshaft is able to rotate around an axis that is perpendicular to a longitudinal axis defined by each cylinder. A crank sensor is placed in an appropriate location, operable to generate a signal that is useable by the controller to measure crank angle, and which is translatable to provide measures of crankshaft rotation, speed, and acceleration that are useable in various control schemes. During operation of the engine, each piston 14 moves up and down in the cylinder in a reciprocating fashion due to connection to and rotation of the crankshaft 16, and the combustion process. The crankshaft effects translation of linear motion of each piston to rotational motion, which can be transmitted to another device, e.g. a vehicle driveline.

The engine head comprises a cast-metal device having one or more intake ports and one or more exhaust ports which flow to the combustion chamber 20. The intake port supplies air to the combustion chamber 20. Combusted (burned) gases flow from the combustion chamber 20 via the exhaust port. Flow of air through each intake port is controlled by actuation of one or more intake valves 22. Flow of combusted gases through each exhaust port is controlled by actuation of one or more exhaust valves 24.

The intake and exhaust valves 22, 24 each have a head portion that includes a top portion that is exposed to the combustion chamber. Each of the valves 22, 24 has a stem that is connected to a valve actuation device. A valve actuation device 26 is operative to control opening and closing of each of the intake valves 22, and a second valve actuation device 28 operative to control opening and closing of each of the exhaust valves 24. Each of the valve actuation devices 26, 28 comprises a device signally connected to the control system and operative to control timing, duration, and magnitude of opening and closing of each valve, either in concert or individually. One embodiment of the exemplary engine comprises a dual overhead cam system which has variable lift control (VLC) and variable cam phasing (VCP) devices as part of the valve actuation devices 26, 28. VCP devices are operative to control timing of opening or closing of each intake valve and each exhaust valve relative to rotational position of the crankshaft and opens each valve for a fixed crank angle duration. VLC devices are operative to control magnitude of valve lift to one of two positions: for example, one position to 3-5 mm lift for an open duration of 120-150 crank angle degrees, and another position to 9-12 mm lift for an open duration of 220-260 crank angle degrees. Individual valve actuation devices can serve the same function to the same effect. The valve actuation devices are preferably controlled by the control system according to predetermined control schemes. Alternative variable valve actuation devices including, for example, fully flexible electrical or electro-hydraulic devices, may also be used and have the further benefit of independent opening and closing phase control as well as substantially infinite valve lift variability within the limits of the system.

Air is inlet to the intake port through an intake manifold runner 34, which receives filtered air passing through a known air metering device and a throttle valve. Exhaust gas passes from the exhaust port to an exhaust manifold, which includes exhaust gas sensors operative to monitor constituents of the exhaust gas feedstream, and determine parameters associated therewith. The exhaust gas sensors can include any of several known sensing devices operative to provide parametric values for the exhaust gas feedstream, including air/fuel ratio, or measurement of exhaust gas constituents, e.g. NOx, CO, HC, and others. The system may include an in-cylinder sensor for monitoring combustion pressures, or non-intrusive pressure sensors or inferentially determined pressure determination (e.g. through crankshaft accelerations). The aforementioned sensors and metering devices each provide a signal as a parametric input to the control system. These parametric inputs can be used by the control system to determine combustion performance measurements.

The control system preferably includes a subset of an overall control architecture operable to provide coordinated system control of the engine 10 and other systems. In overall operation, the control system is configured to synthesize operator inputs, ambient conditions, engine operating parameters, and combustion performance measurements, and execute algorithms to control various actuators to achieve control targets for fuel economy, emissions, performance, and drivability. The control system is operably connected to a plurality of devices through which an operator controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network (LAN) bus which preferably allows for structured communication of control parameters and commands between various controllers.

The control system is operably connected to the engine 10, and functions to acquire parametric data from sensors, and control a variety of actuators of the engine 10 over appropriate interfaces. The control system receives an engine torque command, and generates a desired torque output, based upon the operator inputs. Exemplary engine operating parameters that are sensed by control system using the aforementioned sensors include engine coolant temperature, crankshaft rotational speed (RPM) and position, manifold absolute pressure, ambient air flow and temperature, and ambient air pressure. A sensor capable of monitoring crankshaft rotational position can be utilized to monitor or determine a progression of the engine and various cylinders through various stages of a combustion cycle. Combustion performance measurements may include measured and inferred combustion parameters, including air/fuel ratio, location of peak combustion pressure, among others.

Actuators controlled by the control system include: fuel injectors; the VCP/VLC valve actuation devices 26, 28; EGR valve; and electronic throttle control module. Fuel injectors are preferably operable to inject fuel directly into each combustion chamber 20.

The control system preferably includes one or more general-purpose digital computers, each generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions.

Algorithms for engine control may be executed during preset loop cycles. Algorithms stored in the non-volatile memory devices are executed by the central processing unit and are operable to monitor inputs from the sensing devices and execute control and diagnostic routines to control operation of the engine, using preset calibrations. Loop cycles may be executed at regular intervals, for example each 3.125, 6.25, 12.5, 25 and 100 milliseconds during ongoing engine operation. Alternatively, algorithms may be executed in response to occurrence of an event or interrupt request.

In this disclosure, a variable valve actuation strategy is adopted to either retain exhaust gas in the cylinder or reintroduce exhaust gas to the cylinder. The hot exhaust gases reduce the engine-out HC/CO emissions and increase the exhaust temperature. A method is disclosed utilizing a variable valve lift strategy to reduce engine out HC and CO emissions. By changing the valve lift profile, more hot exhaust gases can be trapped in the cylinder. Hot exhaust gas improves the fuel vaporization, promotes the fuel oxidation, and improves the combustion stability. Three different strategies can be utilized to increase internal EGR quantity: exhaust re-breathing, exhaust recompression, and intake re-breathing.

In the exhaust recompression strategy, the exhaust gas is trapped in the cylinder by closing the exhaust valve early during the exhaust stroke, (while opening the intake valve with late timing symmetrical to the exhaust valve closing timing). In this valve strategy, the quantity of the internal residual (or internal EGR) depends on how early the exhaust valve closes during the exhaust stroke. For example, if the exhaust valve closes earlier during the exhaust stroke, more hot exhaust gas from the previous engine cycle would be trapped in the cylinder.

Figure 3:
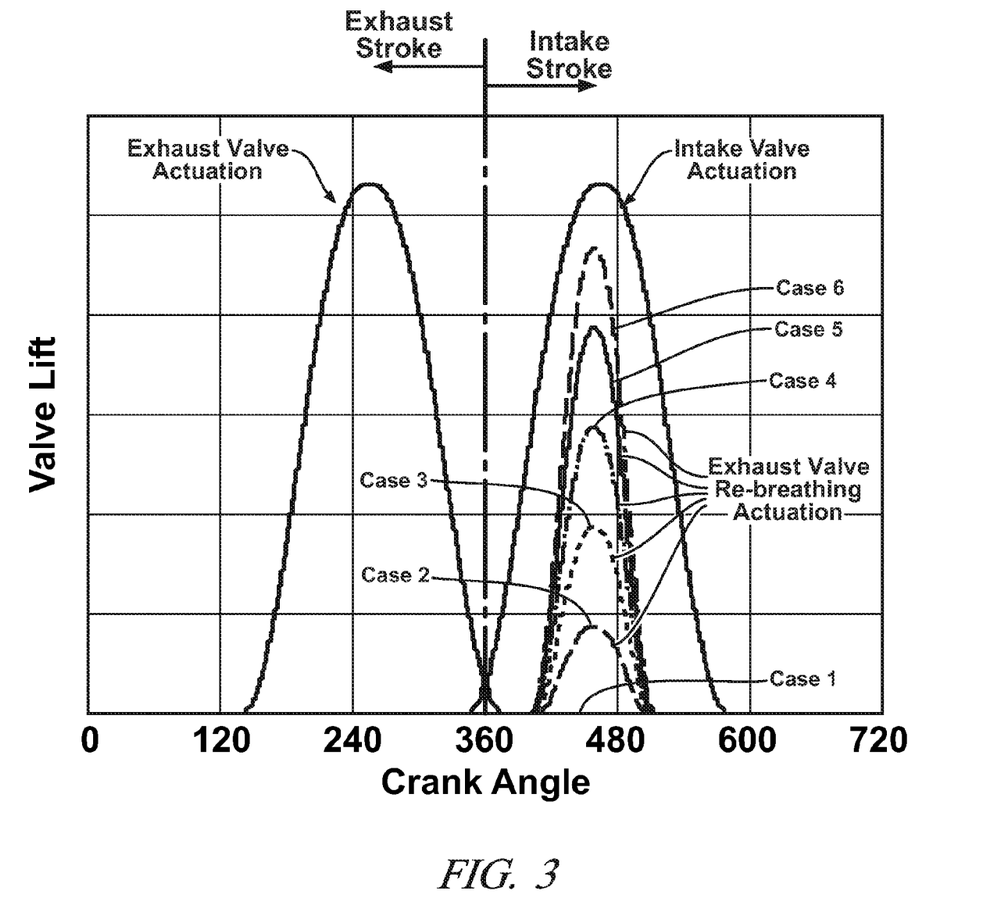
FIG. 3 graphically illustrates valve lift profile for a cylinder operating under an exemplary re-breathing strategy, in accordance with the present disclosure.

In the exhaust re-breathing strategy, the hot exhaust gas is reintroduced into the cylinder by reopening the exhaust valve during the intake stroke. In this valve strategy, the quantity of the internal residual (or internal EGR) depends on the timing, lift, and duration of the reopening valve event. Also, the intake manifold pressure and exhaust manifold pressure will influence the internal residual quantity. FIG. 3 graphically illustrates a valve lift profile for a cylinder operating under an exemplary re-breathing strategy, in accordance with the disclosure. In an exhaust stroke, an exhaust valve is known to open and close, with piston action driving out exhaust gas from the previous combustion cycle. In an intake stroke, an intake valve is known to open and close, with piston action drawing in air from the intake manifold for the next combustion cycle. Exhaust re-breathing includes actuation of the exhaust valve during the intake stroke, wherein, as air is being drawn in through the intake valve, exhaust gas is re-drawn in simultaneously through the exhaust valve. In this way, a portion of the gases within the combustion chamber after the intake stroke include exhaust gases, absent a majority of the oxygen that would be present if replaced by additional air through the intake. This lowering of oxygen content within the combustion chamber reduces the temperature of combustion through the next combustion cycle, thereby accomplishing NOx reduction.

FIG. 3 demonstrates operation of six different cases demonstrating operation of an internal EGR method, wherein the exhaust valve is opened to accomplish drawing residual gases back into the combustion chamber from the exhaust manifold. Case 1 is a control case, wherein the valve is not opened. Cases 2 through 6 demonstrate selection of different exhaust valve opening settings, with the cases demonstrating opening the valve by a greater amount with each case.

Use of residual gas content within the combustion chamber to improve engine emissions is known, for example, through use of an external EGR circuit. However, it is known that in external EGR methods, an EGR cooling device is frequently utilized to lower temperature of EGR gases before reintroducing the EGR gases to the intake manifold. Under start-up conditions, where all of the heat produced in combustion is desired to assist in the warming of the aftertreatment devices, this travel of the EGR gasses through the external EGR circuit wastes needed combustion heat. The internal EGR method of FIG. 3 is additionally beneficial, because no heat is wasted on an external circuit; rather, heat transferred through the re-breathing gases stay in proximity to the cylinder and the exhaust manifold and are quickly passed through the exhaust system to aid in warming of the aftertreatment devices.

In the intake re-breathing strategy, hot exhaust gas is expelled into the intake manifold through opening of the intake valve during the exhaust stroke. Similar to the exhaust re-breathing strategy, the quantity of the internal residual (or internal EGR) depends on the timing, lift, and duration of this intake valve exhaust re-breathing event.

Reducing the HC and CO emissions at idle and low loads can also be realized by heating the intake manifold. However, such a system requires a large expenditure of energy in the manifold that does not contribute to combustion or to powertrain efficiency.

Compared to exhaust recompression, exhaust re-breathing has lower heat transfer and pumping losses. Also, only one exhaust valve lift needs to be modified to realize the exhaust re-breathing strategy. Exhaust recompression, however, requires the modification of all intake and exhaust valve lift profiles, which greatly increases the production cost. Compared to the intake re-breathing, exhaust re-breathing causes lower heat losses since the exhaust manifold is warmer than the intake manifold.

There are benefits to applying a single valve exhaust re-breathing strategy in order to reduce engine-out HC and CO emissions and increase exhaust gas temperature. Experiments were conducted using a single cylinder engine equipped with a fully flexible valve actuation system. The experimental conditions are summarized in Table 1, below. This condition represents a typical idle condition when the engine is still warming up. Substantially 85% of the HC and CO emissions over an FTP cycle occur during engine warm-up. Reducing the emissions during engine warm-up will greatly reduce the emissions during the FTP cycle.

TABLE 1

| Experimental Conditions | |
| --- | --- |
| Speed | 655 rpm |
| IMEP | 210 kPa |
| Intake manifold pressure | 96.5 kPa |
| Exhaust manifold pressure | 103 kPa |
| Intake manifold temperature | 40° C. |
| Engine coolant temperature | 40° C. |
| Fuel injection pressure | 500 bar |
| 50% fuel burn location | 5 After TDC |
| EINOx | 0.5 g/kg-fuel |

Figure 4:
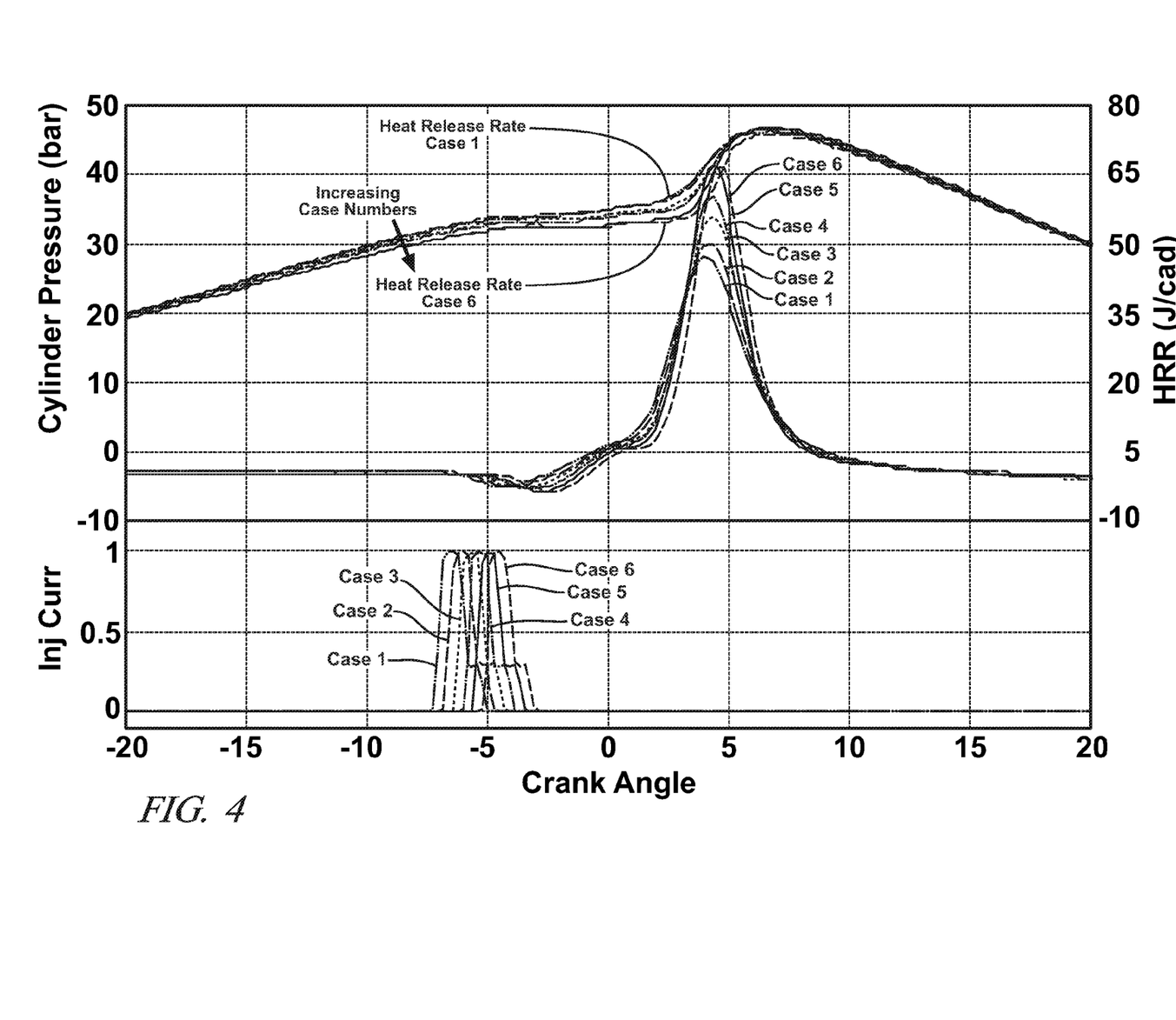
FIG. 4 is a graphical representation of exemplary combustion results from exhaust re-breathing through a series of experimental values, in accordance with the present disclosure.

FIG. 4 is a graphical representation of exemplary combustion results from exhaust re-breathing through a series of experimental values, in accordance with the present disclosure. The six cases described in association with FIG. 3 are depicted in FIG. 4. FIG. 4 shows the cylinder pressure, heat release rate (HRR), injector current, and valve lift profiles of six experiments (cases 1-6) with different exhaust re-breathing valve lift profiles. HRR is depicted in the uppermost set of plots, with the cylinder pressure depicted in the central plots showing a set of dramatic peaks hitting a maximum between around 28-41 bars. It should be noted that in these cases, the exhaust re-breathing is realized by using only one of two exhaust valves. The other valve is not re-opened during the intake stroke. Engine out NOx emissions were maintained constant by using an appropriate amount of external EGR. As described above, case 1 represents the conventional valve lift profile without the exhaust re-breathing. Cases 2 to 6 represent a sweep of increasing exhaust re-breathing valve lift. As expected, the ignition delay time decreases with increasing re-breathing valve lift because of the increasing quantity of hot internal EGR. Peak apparent heat release rate also increases with increasing internal EGR due to the faster chemical reaction rate.

Figure 5:
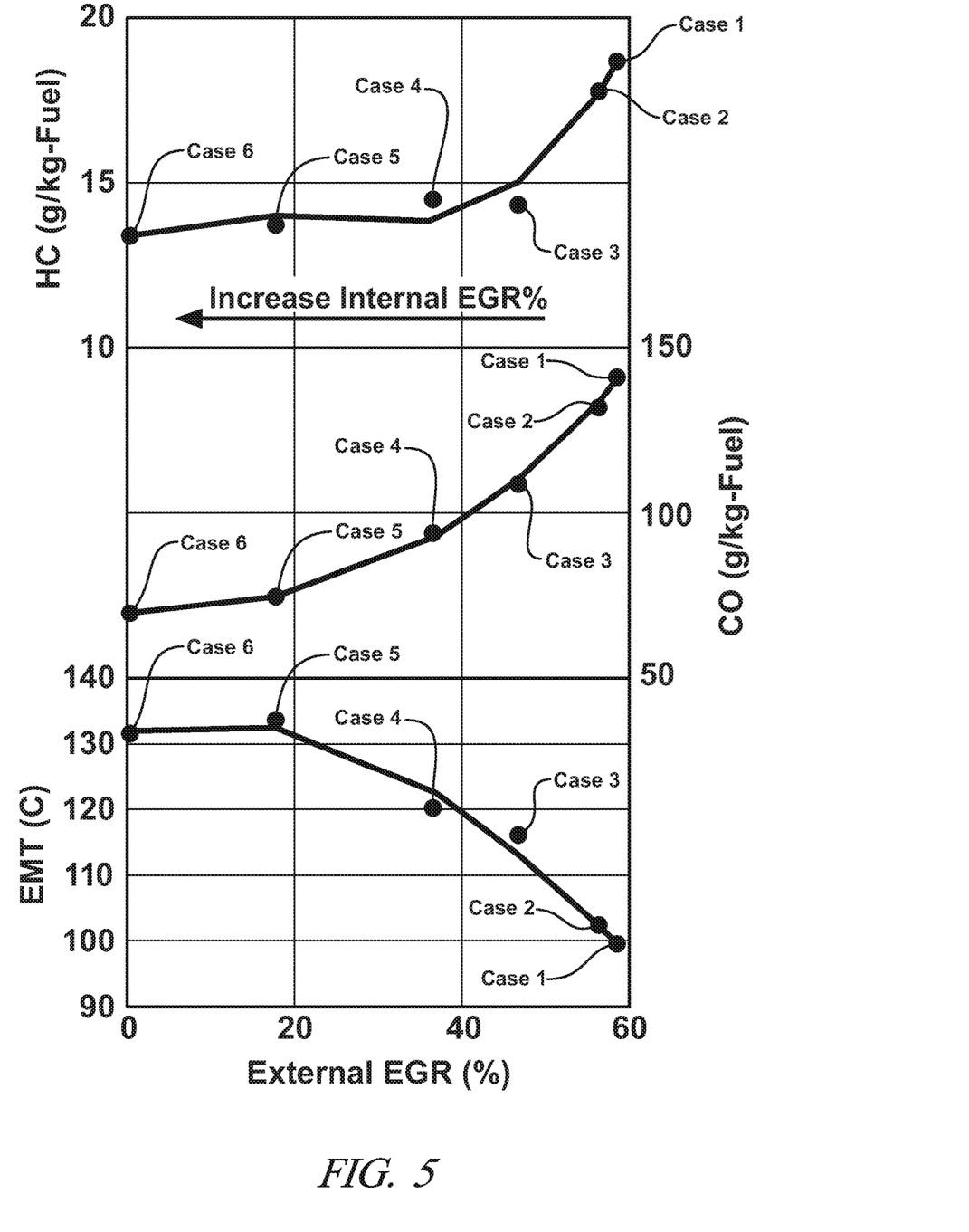
FIG. 5 is a graphical representation of engine out HC and CO emissions and exhaust gas temperature resulting from the exemplary experiment of FIG. 4, in accordance with the present disclosure.

FIG. 5 is a graphical representation of engine out HC and CO emissions and exhaust gas temperature resulting from the exemplary experiment of FIG. 4, in accordance with the present disclosure. Results from cases 1-6 are depicted. The x-axis is the external EGR rate. For the same NOx emissions, less external EGR is needed with increasing re-breathing valve lift. Increasing the internal EGR quantity reduces both HC and CO emissions. Case 6 shows that it is possible to achieve the NOx emission target by using internal EGR only. Overall, HC and CO emissions are reduced by 30% and 55% by using internal EGR through single exhaust valve re-opening during the intake stroke. Exhaust gas temperature increases by more than 30° C., which helps to improve the after-treatment system light-off. Testing of effects of internal and external EGR upon emissions, engine performance, and other factors can be calibrated or modeled and stored in memory within the vehicle for use in controlling operation of the internal and external EGR for desired results. For example, emissions data stored in the memory can be utilized to set a desired residual gas amount for controlling a selectable exhaust valve setting.

Although increasing the hot internal EGR shows great advantage at idle and at low loads, it is not desirable at medium and high loads. The study shows that internal EGR should not be used at loads higher than about 2 bar BMEP. At load higher than 2 bar BMEP, internal EGR can cause high smoke emissions. By monitoring engine load and determining the engine load to be less than a threshold or to exist within a defined low load range, appropriate operation of internal EGR can be achieved.

Exhaust re-breathing may also mitigate EGR cooler fouling by reducing the HC emissions. The presence of HC is one of the major factors that causes EGR cooler fouling. Moreover, as demonstrated above, exhaust re-breathing reduces EGR cooler fouling by totally eliminating the external EGR flow. Another potential benefit is improved engine response. Instead of flowing through the long external EGR loop, hot internal EGR is re-induced directly from the exhaust manifold, which reduces the control lag and thus reduces the emissions during engine transients.

A simple two-step VVA system is preferred in a diesel engine to minimize cost. At idle and low loads, an exhaust re-breathing strategy is used to reduce the HC and CO emissions. At load higher than 2 bar BMEP, the conventional valve profile should be adopted to minimize the smoke emissions.

As noted above, the methods disclosed herein additionally improve the combustion stability by using internal EGR at idle/light loads. Additionally, internal EGR methods mitigate EGR cooler fouling, or contamination of the EGR cooling associated with exposure to exhaust gases, by using internal EGR only at idle/light loads.

It is noted that the internal EGR quantity can be adjusted by controlling the pressure difference between intake and exhaust manifold through methods known in the art.

A common rail fuel injection system and a high pressure fuel pump are needed to deliver the desired pressure to the injector. Exemplary injectors include a solenoid injector or a piezoelectric injector. An engine control module (ECM) is used to execute engine control schemes, based upon operator inputs, ambient conditions, and engine operating conditions. The fuel injection timing and quantity are calibrated and integrated in the ECM.

Although exemplary diesel engine configurations are described for illustrative purposes in this disclosure, the methods described herein can be used in any diesel combustion engine.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling combustion in a direct-injection diesel engine including an intake valve, an exhaust valve, and a plurality of valve activation devices, and a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of the piston, the method comprising:
monitoring a crankshaft rotational position;
monitoring an engine load;
determining an intake stroke within the cylinder based upon the crankshaft rotational position;
monitoring a desired exhaust residual amount based upon a calibrated effect to emissions; and
only when the engine load is less than a threshold engine load defining a maximum load within a low load range, variably controlling an opening of the exhaust valve during a portion of the intake stroke to accomplish drawing exhaust gas residuals back into the cylinder to achieve the desired exhaust residual amount within the cylinder.

2. The method of claim 1, wherein the effect to emissions comprises an effect to hydrocarbon emissions and an effect to carbon monoxide emissions.

3. The method of claim 1,
wherein the variable control is adjusted based upon the desired exhaust residual amount.

4. The method of claim 1, further comprising:
controlling an external exhaust gas recirculation amount based upon the variable control of the opening of the exhaust valve.

5. The method of claim 4, wherein the variable control of the opening of the exhaust valve and the controlling of the external exhaust gas recirculation amount are based upon a calibrated effect to NOx emissions, a calibrated effect to hydrocarbon emissions, and a calibrated effect to carbon monoxide emissions.

6. The method of claim 1, wherein the threshold engine load comprises engine operation resulting in two bar BMEP.

7. The method of claim 1, further comprising monitoring an engine start-up event; and
wherein opening the exhaust valve is performed during a period following the engine start-up event.

8. The method of claim 7, further comprising monitoring an engine temperature; and
wherein opening the exhaust valve is controlled to retain heat within the engine based upon the engine temperature.

9. The method of claim 7, wherein opening the exhaust valve is calibrated based upon a desired exhaust aftertreatment system temperature.

10. Method for controlling combustion in a direct-injection diesel engine including an intake valve, an exhaust valve, and a plurality of valve activation devices, and a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of the piston, the method comprising:
monitoring an engine load;
monitoring a desired exhaust residual amount based upon a calibrated effect to emissions; and
only when the engine load is less than a threshold engine load defining a maximum load within in a low load range, variably controlling an operating of the exhaust valve to open during the intake stroke of the engine to draw exhaust gas from an exhaust manifold into the variable volume combustion chamber to achieve the desired exhaust residual amount.

11. The method of claim 10, further comprising:
wherein operating the exhaust valve to open during the intake stroke of the engine is variably controlled based upon the desired exhaust residual amount.

12. System for controlling combustion in a direct-injection diesel engine including an intake valve, an exhaust valve, and an exhaust valve activation devices, and a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of the piston, the system comprising:
the variable volume combustion chamber;
the exhaust valve;
a control module
monitoring the intake stroke of the piston;
monitoring an engine load;
monitoring a desired exhaust residual amount based upon a calibrated effect to emissions;
determining whether the engine load is in a low range; and
only when the engine load is in the low range, variably controlling the exhaust valve activation device to open the exhaust valve during the intake stroke of the piston to accomplish drawing exhaust gas residuals back into the variable volume combustion chamber to achieve the desired exhaust residual amount.

13. The system of claim 12, wherein controlling the exhaust valve activation device to open the exhaust valve comprises opening the exhaust valve to a selectable setting.

14. The system of claim 13, wherein opening the exhaust valve to a selectable setting is based upon the desired exhaust residual amount.

15. The system of claim 13, further comprising an external exhaust gas recirculation circuit; and
wherein opening the exhaust valve to a selectable setting is controlled in coordination with the external exhaust gas recirculation circuit.

16. The system of claim 14, wherein the control module comprises memory storage including emissions data corresponding to a plurality of selectable settings of the exhaust valve; and
wherein the desired exhaust residual amount is determined based upon the emissions data.

* * * * *